United States Patent
Gündogan (10) Patent No.: US 10,189,492 B2
(45) Date of Patent: Jan. 29, 2019

(54) RUNNING GEAR

(71) Applicant: Birol Gündogan, Kirchberg (DE)

(72) Inventor: Birol Gündogan, Kirchberg (DE)

(73) Assignee: Jung Hebe- und Transporttechnik GmbH, Waiblingen (DE)

( * ) Notice: Subject to any disclaimer, the term of this patent is extended or adjusted under 35 U.S.C. 154(b) by 404 days.

(21) Appl. No.: 13/887,479

(22) Filed: May 6, 2013

(65) Prior Publication Data

US 2013/0300078 A1    Nov. 14, 2013

(30) Foreign Application Priority Data

May 11, 2012  (DE) .................. 10 2012 207 857

(51) Int. Cl.
| | |
|---|---|
| *B62B 3/12* | (2006.01) |
| *B62D 61/06* | (2006.01) |
| *B62B 3/00* | (2006.01) |
| *B62B 5/00* | (2006.01) |
| *B62B 3/06* | (2006.01) |
| *B60B 33/00* | (2006.01) |

(52) U.S. Cl.
CPC ............. *B62B 3/12* (2013.01); *B62B 3/008* (2013.01); *B62B 3/06* (2013.01); *B62B 5/0083* (2013.01); *B62B 5/0086* (2013.01); *B60B 33/0044* (2013.01); *B62B 2203/071* (2013.01); *B62B 2207/02* (2013.01); *B62B 2301/04* (2013.01); *B62B 2301/254* (2013.01)

(58) Field of Classification Search
CPC .................................. B62B 3/12; B62D 61/06
USPC .......................................................... 280/62
See application file for complete search history.

(56) References Cited

U.S. PATENT DOCUMENTS

| | | | | |
|---|---|---|---|---|
| 2,337,670 | A * | 12/1943 | Le Tourneau ............ | B60P 3/00 248/349.1 |
| 2,474,373 | A * | 6/1949 | Seiden .................... | B62K 3/002 280/87.01 |
| 3,623,743 | A * | 11/1971 | Rohrer ..................... | B60D 1/50 280/103 |
| 4,127,202 | A | 11/1978 | Jennings et al. | |
| 4,767,128 | A * | 8/1988 | Terhune .................... | B62B 1/18 188/19 |

(Continued)

FOREIGN PATENT DOCUMENTS

| | | |
|---|---|---|
| DE | 1915796 U | 5/1965 |
| DE | 8227891 U1 | 1/1983 |

(Continued)

*Primary Examiner* — Bryan A Evans
(74) *Attorney, Agent, or Firm* — Reinhart Boerner Van Deuren P.C.

(57) ABSTRACT

The present invention relates to a running gear having a carrier plate and a first roller, a second roller and a third roller, which are arranged on the carrier plate. Simplified handling and/or increased stability of the running gear is produced if the first roller can rotate about a first rolling axis running parallel to a plane of extent of the carrier plate and the second roller can rotate about a second rolling axis running parallel to the plane of extent and the third roller can rotate about a third rolling axis running parallel to the plane of extent. The invention further relates to an arrangement having at least two such running gears, wherein at least two such running gears are connected to each other.

20 Claims, 4 Drawing Sheets

(56) References Cited

U.S. PATENT DOCUMENTS

| | | | | |
|---|---|---|---|---|
| 6,773,025 | B1 * | 8/2004 | Zelm | B62D 63/061 |
| | | | | 280/40 |
| 7,506,405 | B2 * | 3/2009 | Willis | B60B 33/0028 |
| | | | | 16/47 |
| 2004/0064915 | A1 | 4/2004 | Silverstein et al. | |
| 2007/0193073 | A1 | 8/2007 | Doak | |
| 2011/0304109 | A1 | 12/2011 | Cummins | |

FOREIGN PATENT DOCUMENTS

| | | |
|---|---|---|
| DE | 10 2006 042 119 A1 | 3/2007 |
| EP | 0155326 A1 | 9/1985 |
| EP | 1145930 A2 | 10/2001 |

\* cited by examiner

RUNNING GEAR

CROSS-REFERENCE TO RELATED PATENT APPLICATION

This patent application claims the benefit of German application No. 10 2012 207 857.6, filed May 11, 2012, the teachings and disclosure of which are hereby incorporated in their entirety by reference thereto.

FIELD OF THE INVENTION

The present invention relates to a running gear for transporting a load and an arrangement consisting of at least two such running gears.

BACKGROUND OF THE INVENTION

Running gears for transporting loads are used in many different ways, preferably to carry and transport loads of a heavy weight, for example from a few hundred kg to several tonnes. To this end, such a running gear can comprise a carrier plate onto which the load to be transported can be placed. It is also conceivable to equip such a running gear with at least two rollers, which are arranged on an underside of the carrier plate facing away from the load and thus allow transport of the load by pulling or pushing the carrier plate. Such a running gear can for example have four such rollers, which are each connected to the carrier plate at a distance from each other on the underside of the carrier plate such that they can rotate about an associated rotation axis which runs perpendicularly to the carrier plate. This also makes it possible to steer the running gear. The problem in this case is however that, when the load is being transported, that is, when the running gear is being pushed or pulled, an unstable state of the running gear can arise to such an extent that the running gear rotates during transport in an uncontrolled and/or undesired manner about a running gear rotation axis running perpendicular to the carrier plate.

SUMMARY OF THE INVENTION

The present invention is concerned with the problem of specifying an improved or at least different embodiment for a running gear of the type mentioned at the beginning, which in particular has simplified handling and/or more stable behaviour during transport of a load to be transported.

This problem is solved according to the invention by the subject matter of the independent claims. Advantageous embodiments form the subject matter of the dependent claims.

The present invention is based on the general concept of equipping a running gear for transporting a load, comprising a carrier plate, with three rollers, the respective rollers being arranged at a distance from each other and two of the said rollers being rotatable relative to the carrier plate, while the other roller is fixed relative to the carrier plate and can only roll along a subsurface. Here the rotatability of the respective roller arranged rotatably with respect to the carrier plate relates to a rotation axis running perpendicularly to the carrier plate, in particular to a plane of extent of the carrier plate. It is thus in particular achieved that, during transport of the load with the aid of the running gear, that is, in particular during a forward movement or a reverse movement of the running gear, the rotatable rollers are aligned perpendicularly to the direction of travel of the running gear owing to their rotatability relative to the running gear, whereas the other roller is fixed relative to the running gear. This makes it possible to rotate the running gear in any direction and thus to steer, which in particular results in simplified handling of the running gear.

According to the concept of the invention, the running gear comprises the carrier plate, which extends in the plane of extent. The running gear also comprises a first roller, a second roller and a third roller, the respective rollers being arranged at a distance from each other on an underside of the carrier plate. The underside of the carrier plate is preferably the side of the carrier plate which faces away from an upper side of the carrier plate, the load to be carried being arranged on the upper side of the carrier plate. According to the invention, the first roller can rotate about a first rolling axis running parallel to the plane of extent, while the second roller can rotate about a second rolling axis running parallel to the plane of extent, and the third roller can rotate about a third rolling axis running parallel to the plane of extent. In other words, the respective roller can rotate in such a manner that the running gear can be moved along a plane or along a subsurface on which the running gear is arranged, by the respective roller rotating about the associated rolling axis. Additionally, the first roller can rotate about a first rotation axis running perpendicularly to the plane of extent on the carrier plate, while the second rolling axis can rotate about a second rotation axis running perpendicularly to the plane of extent on the carrier plate. This means that the first roller and the second roller can each be rotated about such an associated rotation axis. This results in particular in a rotation of the associated rolling axis relative to the carrier plate in order to steer the running gear. In contrast, the third roller is arranged on the carrier plate in a rotationally fixed manner relative to axes running perpendicular to the plane of extent. Therefore, while the first roller and the second roller allow steering of the running gear, the third roller is fixed relative to axes running perpendicularly to the plane of extent of the carrier plate during a steering movement of the running gear, so the third roller ensures stabilisation of the running gear in that the third roller guides the running gear.

The third roller is preferably arranged permanently on the carrier plate in a rotationally fixed manner relative to axes running perpendicular to the plane of extent. This means in particular that the third roller can be arranged on the carrier plate not only in a rotationally fixed manner relative to the axes running perpendicularly to the plane of extent, for example by means of a locking device and the like, but is permanently rotationally fixed during normal use. In particular, the running gear has preferably no provided options for the rotatable arrangement of the third roller on the carrier plate relative to the axes running perpendicularly to the plane of extent.

The running gear can carry and transport any loads. In particular, the running gear can be configured and/or designed in such a manner that it can carry and transport loads having a weight of several hundred kg and more.

In principle, the running gear can also have more than three rollers, in particular a plurality of guide rollers and/or more than two steering rollers. However, the running gear expediently has only the said three rollers, namely the first roller, the second roller and the third roller. In this case the respective roller can be configured as a rolling body or comprise one or a plurality of rolling bodies. The respective rolling bodies can for example be designed as a wheel and the like. In particular, the first roller which can rotate about the first rotation axis and/or the second roller which can rotate about the second rotation axis can be designed as a steering roller. Furthermore, the third roller can be designed as an unsteered guide roller and/or as a fixed roller.

In this case the respective rotation axis does not necessarily intersect the associated rolling axis. This means that embodiments in which the first rotation axis intersects the first rolling axis of the first roller and embodiments in which the first rotation axis runs eccentrically to the first rolling axis are both conceivable. The same applies correspondingly to the second rotation axis and the second rolling axis.

In preferred embodiments, the first roller and the second roller are arranged in a front region of the carrier plate, while the third roller is arranged in a rear region of the carrier plate, remote from the front region. The running gear can thus be steered in a simplified manner by corresponding application of force, in particular to the front region of the running gear, for example to the carrier plate. Furthermore, the first roller rotates about the first rotation axis and/or the second roller rotates about the second rotation axis in such a manner that the third rolling axis and the first rolling axis and/or the second rolling axis are arranged in parallel in the case of forward travel of the taking place in the direction of the front region and/or in the case of reverse travel of the running gear taking place in the direction of the rear region. Such a parallel arrangement of the respective rolling axis during forward travel and/or reverse travel increases in particular the stability of the running gear during transport, in particular during forward travel and/or reverse travel.

Furthermore, the first roller and the second roller can be arranged on the carrier plate between the third roller and a shaft holder for attaching a shaft. The shaft and shaft holder in particular serve the purpose of being able to move the running gear in a simplified manner, for instance on the said base. The shaft holder is preferably connected to the carrier plate, the shaft holder preferably being connected to the carrier plate in the front region of the carrier plate, in particular on a front side of the carrier plate.

The shaft holder is expediently arranged on a longitudinal centre axis of the carrier plate between the first roller and the second roller. The longitudinal centre axis preferably extends between the front region and the rear region, the longitudinal centre axis of the carrier plate usually corresponding to the longitudinal centre axis of the running gear. The shaft holder is therefore in particular arranged centrally between the first roller and the second roller and/or has the same distance from the first roller and the second roller, in particular with parallel arrangement of the first roller and second roller in the case of forward travel and/or reverse travel. Such an arrangement of the shaft holder means that the application of force to the running gear which takes place with the aid of the shaft holder, in particular for moving and/or steering the running gear, takes place in a simplified manner because the said force is distributed to the rollers.

A further possibility for simplifying the transmission of force to the running gear consists in configuring and/or arranging the first roller and the second roller symmetrically in relation to the longitudinal centre axis. This means in particular that the first roller and the second roller are configured symmetrically in relation to the longitudinal centre axis in particular in the case of a parallel alignment of the first roller axis and the second roller axis. During steering of the running gear by means of the shaft holder or associated shaft, an identical rotary movement of the respective rolling axis, that is, of the first rolling axis and the second rolling axis can thus take place about the associated rotation axis, that is, about the first rotation axis or about the second rotation axis, so steering of the running gear is simplified.

The third roller is also preferably arranged centrally to the longitudinal centre axis of the carrier plate. In particular, the third rolling axis can be configured symmetrically in relation to the longitudinal centre axis. Such a configuration or arrangement of the third roller also contributes to improved handling of the running gear.

In particularly preferred embodiments, the shaft holder is arranged on the longitudinal centre axis of the carrier plate between the first roller and the second roller, while the first roller and the second roller are configured symmetrically in relation to the longitudinal centre axis and the third roller is arranged centrally to the longitudinal centre axis, in particular symmetrically to the longitudinal centre axis. In particular, the third rolling axis runs perpendicularly to the longitudinal centre axis, so that the first rolling axis and the second rolling axis can also run perpendicularly to the longitudinal centre axis during forward travel and/or reverse travel. Such a configuration of the running gear offers in particular the advantage that the weight of the load to be carried is distributed, in particular uniformly, to the respective rollers. The running gear and the load are thereby stabilised during transport.

To further simplify transport of the load, the running gear can comprise a rotary table on the upper side of the carrier plate, on which to place the load. The load can be arranged on the rotary table and then transported. The rotary table is preferably arranged on the carrier plate such that it can rotate about a table rotation axis running perpendicularly to the plane of extent. This means that the first rotation axis and the second rotation axis run parallel to the table rotation axis.

In preferred embodiments, the rotary table is arranged centrally on the carrier plate. This means in particular that the rotary table is arranged eccentrically to the third rolling axis. Preferably, the rotary table is arranged centrally between the first roller and the second roller on one side and the third roller on the other side during forward travel and/or reverse travel. In other words, the table rotation axis of the rotary table is arranged centrally between the third rolling axis and an axis straight line comprising the first rolling axis and the second rolling axis when the first rolling axis, the second rolling axis and the third rolling axis during forward travel and/or during reverse travel, but preferably during forward travel. This ensures in particular that the weight of the load is distributed uniformly between the first roller, the second roller and the third roller.

In principle, the rotation of the first and second rotation axes can take place in any manner about the associated rotation axis. This is preferably realised in that the first roller is mounted on a first roller carrier such that it can rotate about the first rolling axis, the first roller carrier being mounted on the carrier plate such that it can rotate about the first rotation axis. The first rotation axis can thereby run at a distance from the first rolling axis, so that the first rotation axis runs eccentrically to the first rolling axis. The same applies correspondingly to the second roller, which can be mounted on a second roller carrier such that it can rotate about the second rolling axis, while the second roller carrier is mounted on the carrier plate such that it can rotate about the second rotation axis. Consequently, the second rotation axis can also run eccentrically to the second rolling axis. The running gear preferably has both the first roller carrier and the second roller carrier. The respective roller carrier can have a bearing, the associated rotation axis being defined by this bearing. The said bearing can for example be designed as a ball bearing which ensures rotation about the associated rotation axis.

The rotatability of the respective roller about the associated rolling axis or the rolling of the respective roller can be realised generally in any manner. If the respective roller has one or a plurality of such rolling bodies, the respective rolling body can rotate by means of an associated rolling body bearing. The respective rolling body bearing can in particular be arranged on an associated roll bar, which for its part is rigid, so that the rotatability of the respective roller is realised by a rotation of the respective rolling body about the said roll bar, in particular by means of such a rolling body bearing. The respective roll bar and the associated rolling axis are expediently coaxial.

The running gear, in particular the first roller and the second roller, is preferably configured in such a manner that a connecting straight line which intersects the respective rotation axis perpendicularly runs parallel to the third rolling axis. This means in particular that the first roller and the second roller are arranged such that they are not offset to each other along the longitudinal centre axis. This also means in particular that the connecting straight line connects a first intersection point of the first rotation axes to the carrier plate and a second intersection point of the second rotation axis to the carrier plate and runs substantially parallel to the third rolling axis.

In preferred embodiments, the first roller and the second roller are identical. This results in a reduction in production costs, because fewer different parts are needed, and in better handling of the running gear.

The table rotation axis is expediently arranged on the longitudinal centre axis of the carrier plate. In other words, the table rotation axis intersects the longitudinal centre axis of the carrier plate. The rotary table is therefore preferably arranged centrally on the carrier plate in relation to a width of the carrier plate running perpendicularly to the longitudinal centre axis. This acts in particular to distribute the weight of the load to be carried uniformly onto the carrier plate and thus also onto the respective roller.

In order to achieve a particularly stable arrangement of the third roller on the carrier plate, the running gear can comprise two cheeks on the underside of the carrier plate, which cheeks are penetrated by the third rolling axis and enclose the third roller. This means that the respective cheek can in particular run perpendicularly to the third rolling axis. In this case the cheeks can be penetrated by such an associated roll bar of the third roller, so that the rotatability of the third roller is realised by means of associated rolling bodies, which are arranged between the cheeks and rotate about the associated roll bar, for example with the aid of associated rolling body bearings, the roll bar preferably being rigid in relation to the carrier plate.

The respective roller can be arranged entirely underneath the carrier plate. However, embodiments in which the respective roller projects laterally beyond the carrier plate are also conceivable. The third roller is preferably arranged on the carrier plate entirely underneath the carrier plate, while the first roller and/or the second roller project laterally beyond the carrier plate transversely to the longitudinal centre axis, in particular with a parallel alignment of the rolling axes. For example, such an associated rolling body can project laterally beyond the carrier plate.

The shaft holder makes it possible to move and/or steer the running gear on a base with the aid of a shaft. The running gear is therefore driven with the aid of the shaft and the shaft holder. To connect the shaft to the shaft holder, the shaft holder can have a tongue which runs transversely to the carrier plate and in which the shaft can be hung or latched. To latch the shaft in place, the shaft holder can also have latching openings in which associated projections, for example bolts, of the shaft can engage.

In preferred embodiments, the shaft holder has connecting openings through which a connecting bar can be guided. The connecting openings preferably correspond to the latching openings and are expediently arranged on opposite sides of the shaft holder transversely to the longitudinal centre axis. The connecting openings serve the purpose of connecting such a running gear to one or a plurality of other such running gears with the aid of the connecting bar. An undesired rotation or steering movement of the individual running gear during travel of the running gear is prevented by such a connecting bar, which in particular results in a stable behaviour of the running gears coupled in this manner.

An arrangement of at least two such running gears is thus created in order to be able to transport larger loads too. In this case the load is arranged on the respective running gear at regions of the load which are spaced apart from each other, it still being possible for the above-mentioned advantages of the running gear to be utilised.

In particular, the arrangement can have three such running gears, two such running gears being connected to each other with the aid of such a connecting bar. The running gears which are connected to each other are arranged in a rear region of the arrangement, while the other running gear is arranged in a front region of the arrangement. The application of force for transporting the load can thus take place to the last running gear, so that forward travel and/or reverse travel of the arrangement and steering of the arrangement are simplified.

It is self-evident that the arrangement can also comprise three or four or more running gears, at least two such running gears being connected to each other by means of the said connecting bar.

The present invention relates to a running gear having a carrier plate and a first roller, a second roller and a third roller, which are arranged on the carrier plate. Simplified handling and/or increased stability of the running gear is produced if the first roller can rotate about a first rolling axis running parallel to a plane of extent of the carrier plate and the second roller can rotate about a second rolling axis running parallel to the plane of extent and the third roller can rotate about a third rolling axis running parallel to the plane of extent, wherein the first roller can rotate about a first rotation axis running perpendicularly to the plane of extent on the carrier plate and the second roller can rotate about a second rotation axis running perpendicularly to the plane of extent on the carrier plate, while the third roller is arranged on the carrier plate in a rotationally fixed manner in relation to axes running perpendicularly to the plane of extent. The invention further relates to an arrangement having at least two such running gears, wherein at least two such running gears are connected to each other.

Further important features and advantages of the invention can be found in the subclaims, the drawings and the associated description of the figures using the drawings.

It is self-evident that the above-mentioned features and those still to be explained below can be used not only in the combination given in each case but also in other combinations or alone without departing from the scope of the present invention.

BRIEF DESCRIPTION OF THE DRAWINGS

Preferred exemplary embodiments of the invention are shown in the drawings and are explained in more detail in the description below, the same reference symbols referring to the same or similar or functionally equivalent components.

In the figures.

DETAILED DESCRIPTION OF THE INVENTION

Figure 1:
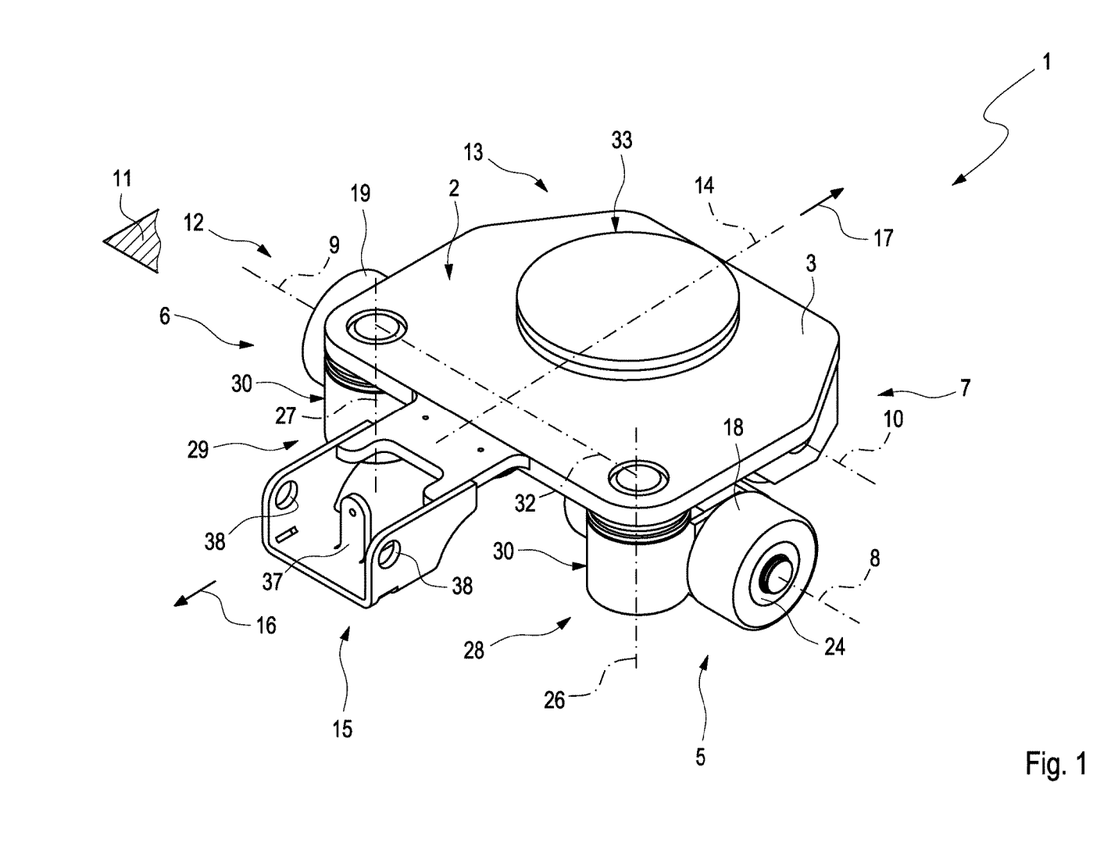
FIG. 1 schematically shows a spatial view of a running gear.
Figure 2:
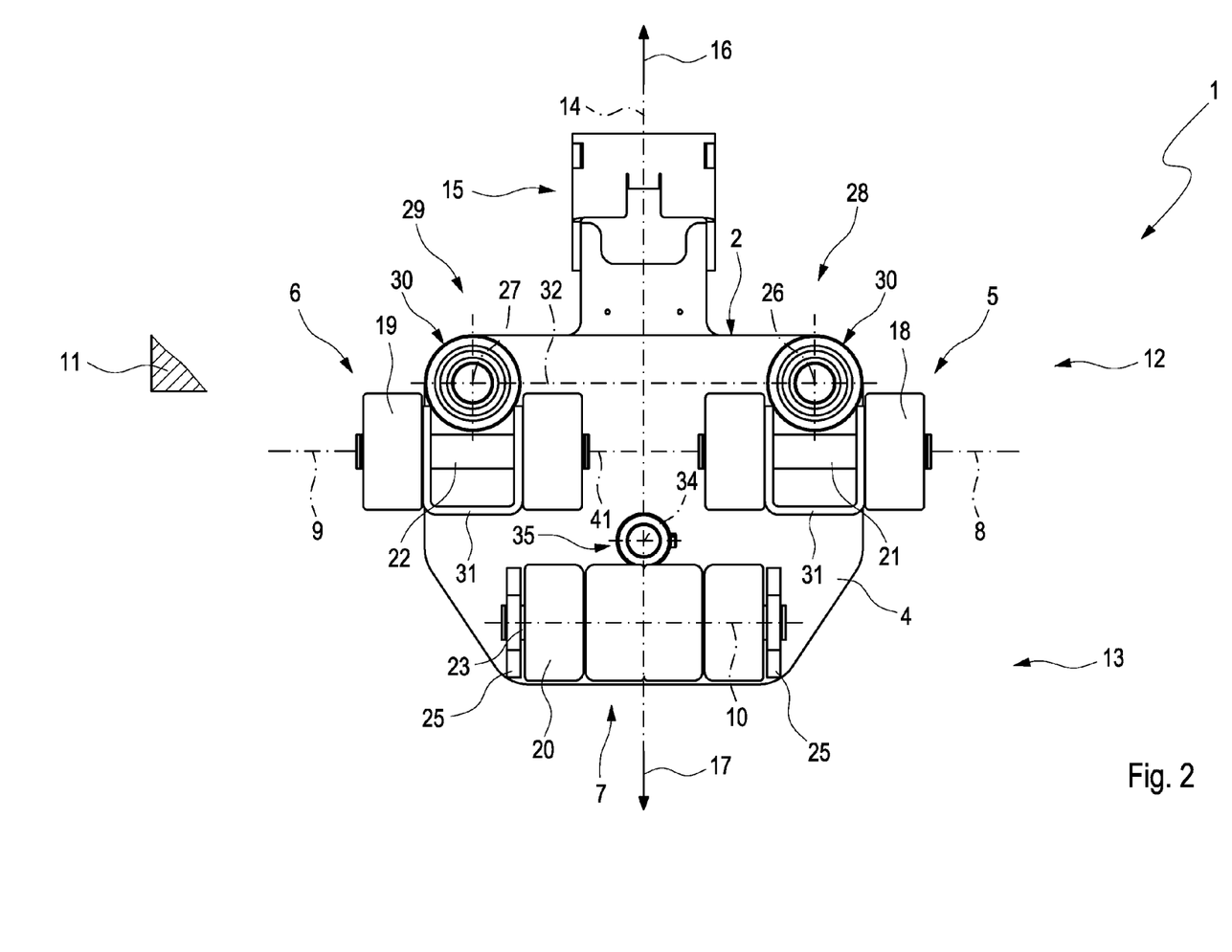
FIG. 2 shows a plan view of the underside of the running gear.
Figure 3:
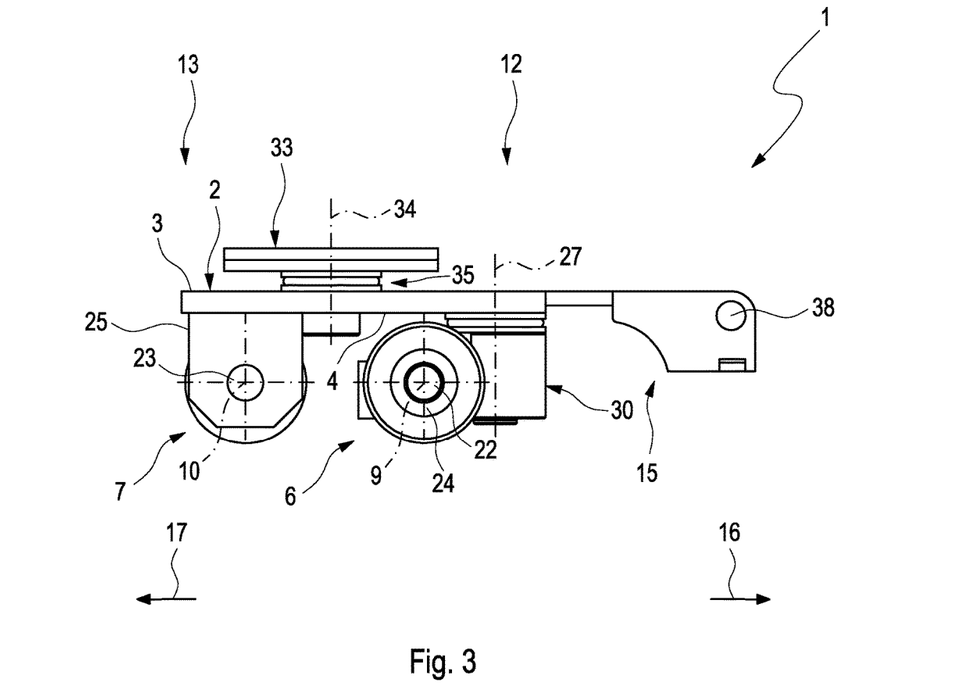
FIG. 3 schematically shows a side view of the running gear.

FIGS. 1 to 3 show a running gear 1 for transporting a load from different perspectives. Here the running gear 1 comprises a carrier plate 2, the upper side 3 of which can be seen in FIG. 1 and the underside 4 of which, which faces away from the upper side 3, can be seen in FIG. 2. The running gear 1 further comprises a first roller 5, a second roller 6 and a third roller 7 on the underside 4 of the carrier plate 2. The first roller 5 can rotate about a first rolling axis 8, while the second roller 6 can rotate about a second rolling axis 9. Furthermore, the third roller 7 can rotate about a third rolling axis 10. The first rolling axis 8, the second rolling axis 9 and the third rolling axis 10 run parallel to a plane of extent 11 of the carrier plate 2.

As can be seen in particular in FIG. 2, the first roller 5 and the second roller 6 are identical and configured as identical parts. The first roller 5 and the second roller 6 are arranged in a front region 12 of the running gear 1, in particular of the carrier plate 2, while the third roller 7 is arranged in a rear region 13 of the running gear or of the carrier plate 2. A longitudinal centre axis 14 of the running gear 1 or of the carrier plate 2 extends between the front region 12 and the rear region 13 of the carrier plate 2. As can be seen in particular in FIG. 2, the third roller 7 is arranged centrally to the longitudinal centre axis 14 and configured symmetrically to the longitudinal centre axis 14. Furthermore, the first roller 5 and the second roller 6, in particular with the parallel arrangement shown of the first rolling axis 8 and the second rolling axis 9, are arranged symmetrically to the longitudinal centre axis 14.

The running gear 1 further comprises a shaft holder 15, which is configured symmetrically in relation to the longitudinal centre axis 14 and is connected to the carrier plate 2 in the front region 12 of the carrier plate 2. The shaft holder 15 is thus arranged centrally between the first roller 5 and the second roller 6 in relation to the longitudinal centre axis 14. The running gear 1 can in particular be moved by corresponding application of force with the aid of the shaft holder 15, the running gear 1 moving in the direction of the front region 12 during forward travel indicated with an arrow 16 and in the direction of the rear region 13 during reverse travel indicated with an arrow 17. In this case the respective roller 5, 6, 7 has associated rolling bodies 18, 19, 20, which roll on a corresponding subsurface during travel of the running gear 1 and rotate about the associated rotation axis 8, 9, 10. Whereas in the example shown the first roller 5 has two first rolling bodies 18 and the second roller 6 has two second rolling bodies 19, the third roller 10 comprises four third rolling bodies 20.

As can be seen in particular in FIG. 2, the respective roller 5, 6, 7 also comprises a roll bar 21, 22, 23, the first roller 5 comprising a first roll bar 21, the second roller 6 comprising a second roll bar 22 and the third roller 7 comprising a third roll bar 23. In this case the respective rolling body 18, 19, 20 rotates about the associated roll bar 21, 22, 23, so that the rotatability of the respective roller 5, 6, 7 about the associated rolling axis 8, 9, 10 is realised in that the respective rolling body 18, 19, 20 rotates about the associated roll bar 21, 22, 23, while the respective roll bar 21, 22, 23 runs coaxially to the associated rolling axis 8, 9, 10, but does not rotate about this associated rolling axis 8, 9, 10 and is in this sense rigid. The rotatability of the respective rolling body 18, 19, 20 about the associated rolling axis 8, 9, 10 or about the associated roll bar 21, 22, 23 is realised in the embodiment shown with a rolling body bearing 24 associated with the respective rolling body 18, 19, 20.

The carrier plate 2 is narrower in the rear region 13 than in the front region 12 in the example shown. This means that a width of the carrier plate 2 running transversely to the longitudinal centre axis 14 is smaller in the rear region 13 than in the front region. In the narrow front region 13, the running gear 1 has two cheeks 25, which are arranged perpendicularly to the carrier plate 2 on the underside of the carrier plate 2 and are penetrated by the third roll bar 23. The two cheeks 25 enclose the third roller 7 or the third rolling body 20 transversely to the longitudinal extent 14 of the carrier plate 2. The third roller 7 is thus stabilised during transport of the load, in particular during forward travel 16 and/or reverse travel 17.

According to the invention, the first roller 5 and thus the first rolling axis 8 can rotate about a first rotation axis 26, while the second roller 6 and thus the second rolling axis 9 can rotate about a second rotation axis 27, the first rotation axis 26 and the second rotation axis 27 running perpendicularly to the plane of extent 11 of the carrier plate 2. In the example shown, the respective rotation axes 26, 27 run eccentrically to the associated rolling axis 8, 9. In contrast to the first rolling axis 8 and to the second rolling axis 9, the third rolling axis 10 and thus the third roller 7 is arranged on the carrier plate 2 in a rotationally fixed manner in relation to axes running perpendicularly to the plane of extent 11. This means that the carrier plate 2 and thus the running gear 1 can be steered with the aid of the first roller 5 and the second roller 6.

The first roller 5 is connected to the carrier plate with the aid of a first roller carrier 28, while the second roller 6 is connected to the carrier plate 2 with the aid of a second roller carrier 29. The first roller carrier 28 and the second roller carrier 29 are configured as identical parts. The respective roller carrier 28, 29 comprises a roller carrier bearing 30 and a U-shaped holder 31 which is connected in a rotationally fixed manner to the roller carrier bearing 30. The opposite limbs of the U-shaped holder 31 are penetrated by the associated roll bar 21, 22 of the associated roller 5, 6, which are connected to the associated holder 31 in a rotationally fixed manner. Furthermore, the first roller carrier 28 can rotate about the first rolling axis 26 with the aid of the associated rolling carrier bearing 30, while the second roller carrier 29 can rotate about the second rotation axis 27 with the aid of the associated roller carrier bearing 30. The first rolling axis 8 and the first roll bar 21 and thus the first roller 5 can thus rotate about the first rotation axis 26, while the second rolling axis 9 and the second roll bar 22 and thus the second roller 6 can rotate about the second rotation axis 27. All the figures show a state of the respective running gear 1 during forward travel 16, in which the first rolling axis 8, the second rolling axis 9 and the third rolling axis 10 run parallel.

Additionally, such a first rolling body 18 of the first roller 5 and such a second rolling body 19 of the second roller 6 project laterally from the carrier plate 2. It can also be seen from FIG. 2 that a connecting straight line 32, which intersects the first rotation axis 26 and the second rotation axis 27 perpendicularly, runs parallel to the third rolling axis 10.

In FIGS. 1 to 3, it can also be seen that the running gear 1 comprises a rotary table 33, on which the load to be carried can be arranged, on the upper side 3 of the carrier plate 2. The rotary table 33 is attached to the carrier plate 2 such that it can rotate about a table rotation axis 34 running perpendicularly to the plane of extent 11. The table rotation axis 34 thus runs parallel to the first rotation axis 26 and to the second rotation axis 27. The rotation of the rotary table 33 about the table rotation axis 34 is realised with the aid of a rotary table bearing 35, which is arranged in the carrier plate 2. The table rotation axis 34 runs centrally through the rotary table 33. Furthermore, the rotary table 33, in particular the rotary table bearing 35, is arranged in such a manner that the rotary table 33 is arranged centrally between the first roller 5 and the second roller 6 on one side and the third roller 7 on the other side during forward travel 16 of the running gear 1. This can be seen in particular in FIG. 3, in which the same distance between the rotary table axis 34 and the second rolling axis 9, and between the rotary table axis 34 and the third rolling axis 10, which distance runs along the longitudinal extent 14, can easily be seen. This is also clear from FIG. 2, in which is can be seen that the rotary table axis 34 and thus the rotary table 33 is arranged centrally between an axis straight line 41, which comprises the first rolling axis 8 and the second rolling axis 9, and the third rolling axis 10. The weight of the load to be carried is thereby distributed uniformly onto the rollers 5, 6, 7, in particular during forward travel 16 of the running gear 1.

In FIG. 2 it can also be seen that the rotary table bearing 35 is arranged on the longitudinal centre axis 14, as a result of which the rotary table axis 34 intersects the longitudinal centre axis 14.

Figure 4:
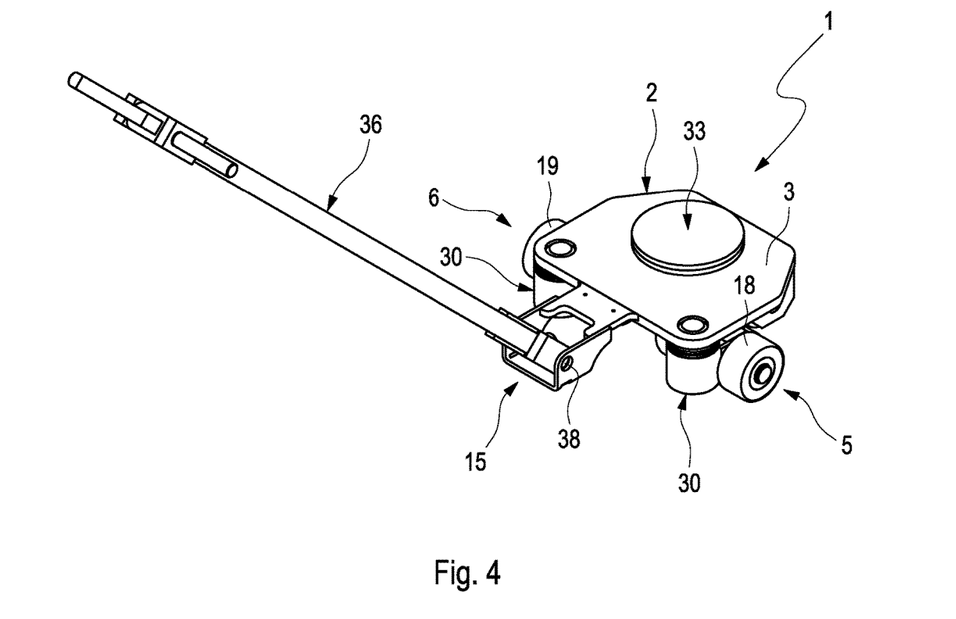
FIG. 4 schematically shows a spatial view of a running gear with a shaft.

The shaft holder 15 has a tongue 37 for hooking in a shaft 36 (see FIG. 4), which projects perpendicularly to the carrier plate 2. A shaft 36 can thereby be hung into the shaft holder 15, as shown in FIG. 4, as a result of which the running gear 1 can be moved and steered by means of the shaft holder 15 and the shaft 36.

The shaft holder 15 also has two connecting openings 38, which are arranged on opposite sides of the shaft holder 15 transversely to the longitudinal centre axis 14, so that a connecting bar 39 (FIG. 5) can be pushed through it.

Figure 5:
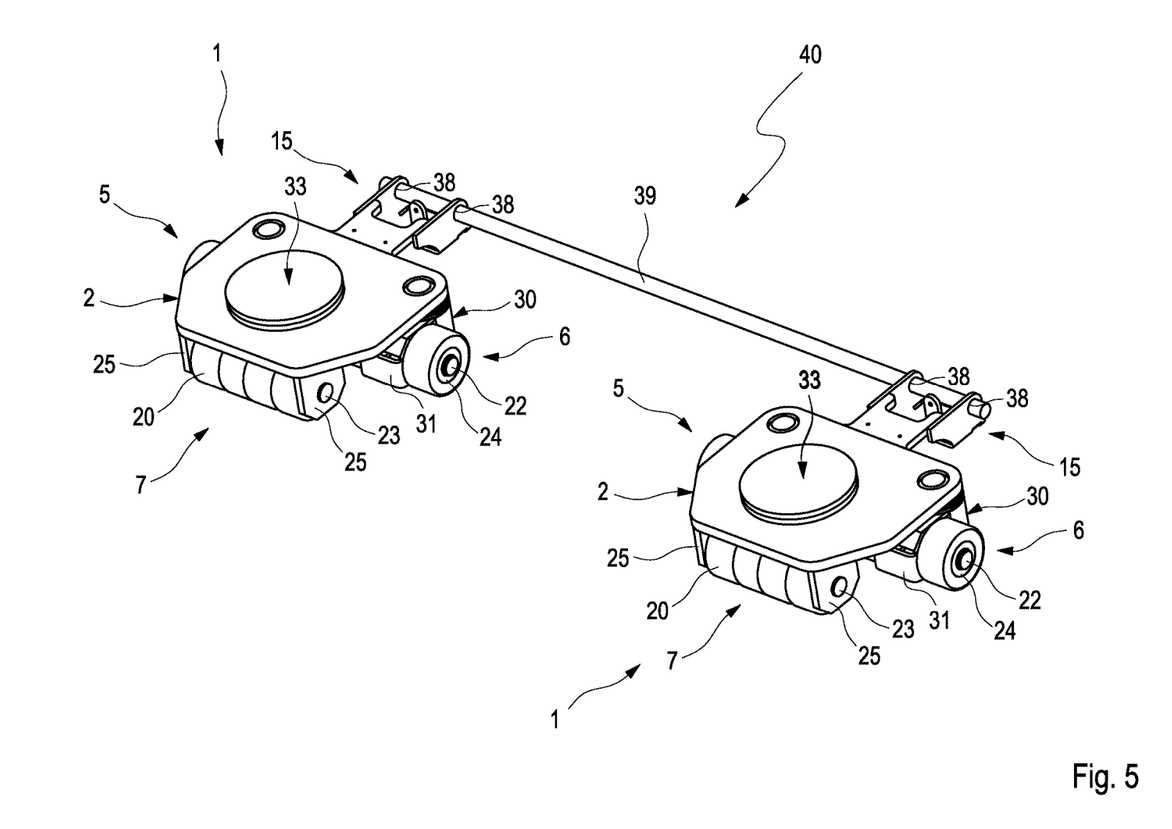
FIG. 5 schematically shows a spatial view of an arrangement with two running gears.

FIG. 5 shows an arrangement 40 having two such running gears 1, which are connected to each other by the connecting bar 39. The connecting bar 39 is guided through the connecting openings 38 of one running gear 1 and through the connecting openings 38 of the other running gear 1.

The invention claimed is:

1. A running gear for transporting a load, having a carrier plate, which extends in a plane of extent, wherein the running gear comprises:
    a first roller, which can rotate about a first rolling axis running parallel to the plane of extent, on an underside of the carrier plate;
    a second roller, which is at a distance from the first roller and can rotate about a second rolling axis running parallel to the plane of extent, on the underside;
    a third roller, which is at a distance from the first roller and the second roller and can rotate about a third rolling axis running parallel to the plane of extent, on the underside;
    a shaft holder having two opposing walls and a bottom wall therebetween;
    wherein the shaft holder has at least one connecting opening, each of the at least one connecting opening being positioned on one of the two opposing walls;
    wherein the first roller can rotate about a first rotation axis running perpendicularly to the plane of extent on the carrier plate;
    wherein the second roller can rotate about a second rotation axis running perpendicularly to the plane of extent on the carrier plate; and
    wherein the third roller is arranged on the carrier plate in a rotationally fixed manner in relation to axes running perpendicularly to the plane of extent.

2. The running gear according to claim 1, wherein the first roller and the second roller are arranged in a front region of the carrier plate and the third roller is arranged in a rear region of the carrier plate at a distance from the front region.

3. The running gear according to claim 1, wherein the first roller and the second roller are arranged on the carrier plate between the third roller and the shaft holder.

4. A running gear for transporting a load, having a carrier plate, which extends in a plane of extent, wherein the gear comprises,
    a first roller, which can rotate about a first rolling axis running parallel to the plane of extent, on an underside of the carrier plate;
    a second roller, which is at a distance from the first roller and can rotate about a second rolling axis running parallel to the plane of extent, on the underside;
    a third roller, which is at a distance from the first roller and the second roller and can rotate about a third rolling axis running parallel to the plane of extent, on the underside;
    a shaft holder having two opposing walls and a bottom wall therebetween;
    wherein the shaft holder has at least one connecting opening, each of the at least one connecting opening being positioned on one of the two opposing walls;
    wherein the first roller can rotate about a first rotation axis running perpendicularly to the plane of extent on the carrier plate;
    wherein the second roller can rotate about a second axis running perpendicularly to the plane of extent on the plate;
    wherein the third roller is arranged on the carrier plate in a rotationally fixed manner in relation to axes running perpendicularly to the plane of extent; and
    wherein the shaft holder is arranged on a longitudinal centre axis of the carrier plate between the first roller and the second roller.

5. The running gear according to claim 1, wherein the third roller is arranged centrally to the longitudinal centre axis of the carrier plate.

6. The running gear according to claim 1, wherein the first roller and the second roller are configured symmetrically in relation to the longitudinal centre axis.

7. The running gear according to claim 1, wherein the running gear comprises on the upper side of the carrier plate, facing away from the rollers, a rotary table on which a load can be placed and which is arranged on the carrier plate such that it can rotate about a table rotation axis running perpendicularly to the plane of extent.

8. The running gear according to claim 1, wherein:
the first roller is mounted on a first roller carrier such that it can rotate about the first rolling axis, wherein the first roller carrier is mounted on the carrier plate such that it can rotate about the first rotation axis, and/or
the second roller is mounted on a second roller carrier such that it can rotate about the second rolling axis, wherein the second roller carrier is mounted on the carrier plate such that it can rotate about the second rotation axis.

9. The running gear according to claim 8, wherein a connecting straight line which perpendicularly intersects the first rotation axis and the second rotation axis runs substantially parallel to the third rolling axis.

10. The running gear according to claim 7, wherein the table rotation axis of the rotary table is arranged centrally between the third rolling axis and an axis straight line comprising the first rolling axis and the second rolling axis during forward travel in the case of parallel arrangement of the first rolling axis, the second rolling axis and the third rolling axis.

11. The running gear according to claim 7, wherein the table rotation axis intersects the longitudinal centre axis of the carrier plate.

12. The running gear according to claim 1, wherein the running gear comprises two cheeks, which are penetrated by the third rolling axis and enclose the third roller, on the underside of the carrier plate.

13. The running gear according to claim 1, wherein the first roller and/or the second roller project laterally beyond the carrier plate transversely to the longitudinal centre axis, at least in some regions.

14. The running gear according to claim 1, wherein the at least one connecting opening is configured for guiding through a connecting bar.

15. An arrangement having at least two running gears according to claim 1, wherein at least two such running gears are connected to each other by a connecting bar.

16. A running gear for transporting a load, having a carrier plate, which extents in a plane of extent, wherein the running gear comprises;
a first roller, which can rotate about a first rolling axis running parallel to the a plane of extent, on an underside of the carrier plate;
a second roller, which at a distance from the first roller and can rotate about a second rolling axis running to the plane of extent on the underside;
a third roller, which is at a distance from the first roller and the second roller and can rotate about a third rolling axis running parallel to the plane of extent, on the underside;
a shaft holder having two opposing walls and a bottom wall therebetween;
wherein the shaft holder has at least one connecting opening, each of the at least one connecting opening being positioned on one of the two opposing walls;
wherein the first roller can rotate about a first rotation axis running perpendicularly to the plane of extent on the carrier plate;
wherein the second roller can rotate about a second rotation axis running perpendicularly to the plane of extent on the carrier plate; and
wherein the third roller is arranged on the carrier plate in a rotationally fixed manner in relation to axes running perpendicularly to the plane of extent;
the running gear further comprising a tongue configured for hooking in a shaft, the tongue projecting from the shaft holder in a direction perpendicular to the plane of extent of the carrier plate.

17. The running gear according to claim 16, wherein the tongue projects from the bottom wall of the shaft holder.

18. A running gear for transporting a load, having a carrier plate, which extents in a plane of extent, wherein the running gear comprises;
a first roller, which can rotate about a first rolling axis running parallel to the plane of extent, on an underside of the carrier plate;
a second roller, which is at a distance from the first roller and can rotate about a second rolling axis running parallel to the plane of extent, on the underside;
a third roller, which is at a distance from the first roller and the second roller and can rotate about a third rolling axis running parallel to the plane of extent, on the underside,
a shaft holder having two opposing walls and a bottom wall therebeteen;
wherein the shaft holder has at least one connecting opening, each of the at least one connecting opening being positioned on one of the two opposing walls;
wherein the first roller can rotate about a first rotation axis running perpendicularly to the plane of extent on the carrier plate;
wherein the second roller can rotate about a second rotation axis running perpendicularly to the plane of extent on the carrier plate,
wherein the third roller is arranged on the carrier plate in a rotationally fixed manner in relation to axes running perpendicularly to the plane of extent; and p1 wherein the first roller comprises a first rolling body and a second rolling body, wherein the second roller comprises a first rolling body and a second rolling body, and wherein the third roller comprises a first rolling body, a second rolling body, a third rolling body, and a fourth rolling body.

19. The running gear according to claim 18, wherein the first roller is mounted on a first roller carrier in such a way that the first rolling body of the first roller is spatially disposed from the second rolling body of the first roller;
wherein the second roller is mounted on a second roller carrier in such a way that the first rolling body of the second roller is spatially disposed from the second rolling body of the second roller; and
wherein the first rolling body, the second rolling body, the third rolling body, and the fourth rolling body of the third roller are positioned between two cheeks mounted to the underside of the carrier plate.

20. The running gear according to claim 6, wherein the first roller and the second roller are configured in parallel alignment.

* * * * *

UNITED STATES PATENT AND TRADEMARK OFFICE
CERTIFICATE OF CORRECTION

PATENT NO. : 10,189,492 B2
APPLICATION NO. : 13/887479
DATED : January 29, 2019
INVENTOR(S) : Birol Gündogan It is certified that error appears in the above-identified patent and that said Letters Patent is hereby corrected as shown below:

In the Claims

Column 10, Claim 4, Line 3: delete "comprises," and replace with --comprises:--

Column 11, Claim 16, Line 8: delete "axis running to the" and replace with --axis running parallel to the--

Column 11, Claim 16, Line 9: delete "extent" and replace with --extent,--

Column 12, Claim 18, Line 3: delete "gear comprises;" and replace with --gear comprises:--

Column 12, Claim 18, Line 13: delete "underside," and replace with --underside;--

Column 12, Claim 18, Line 24: delete "extent on the carrier plate," and replace with --extent on the carrier plate;--

Column 12, Claim 18, Line 27: delete "P1 wherein"

Column 12, Claim 18, Line 28: add at beginning --wherein--

Signed and Sealed this
Twenty-sixth Day of March, 2019

Andrei Iancu
*Director of the United States Patent and Trademark Office*